United States Patent
O'Neill

(10) Patent No.: US 7,031,397 B1
(45) Date of Patent: Apr. 18, 2006

(54) COMMUNICATION SYSTEM WITH REDUCED POWER VARIATION AND METHOD THEREFOR

(75) Inventor: Rorie O'Neill, Westlea (GB)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/743,593

(22) PCT Filed: Jul. 5, 1999

(86) PCT No.: PCT/EP99/04734

§ 371 (c)(1),
(2), (4) Date: Mar. 15, 2001

(87) PCT Pub. No.: WO00/03552

PCT Pub. Date: Jan. 20, 2000

(30) Foreign Application Priority Data

Jul. 11, 1998 (GB) .................................... 9815025

(51) Int. Cl.
H04L 27/28 (2006.01)
H04L 27/20 (2006.01)
(52) U.S. Cl. ..................... 375/265; 375/260; 375/302
(58) Field of Classification Search ............... 375/265, 375/279, 295, 316, 341, 146, 260, 261, 262, 375/348; 370/210, 203, 342, 206, 207, 208; 714/794, 792
See application file for complete search history.

(56) References Cited

U.S. PATENT DOCUMENTS 5,329,552 A * 7/1994 de Couasnon et al. ...... 375/295
5,502,744 A * 3/1996 Marshall ..................... 375/261
5,642,384 A * 6/1997 Ramesh ...................... 375/265
5,835,536 A * 11/1998 May et al. ................... 375/260
5,862,182 A * 1/1999 Awater et al. ............... 375/279

(Continued)

FOREIGN PATENT DOCUMENTS

DE 19625054 A1 6/1996

(Continued)

OTHER PUBLICATIONS

Wilkinson T.A. Et Al.: "Minimisation Of The Peak To Mean Envelope Power Ration Of Multicarrier Transmission Schemes By Block Codeing", Proceedings Of The Vehicular Technology Conference, Chicago, Jul. 25-28, 1995, vol. 2, Jul. 25, 1995, Institute Of Electrical And Electronics Engineers, pp. 825-829, Xp000551649.

(Continued)

Primary Examiner—Betsy L. Deppe
(74) Attorney, Agent, or Firm—Kenneth A. Haas; Steven A. May; Brian M. Mancinci

(57) ABSTRACT

Communication systems employing subchannel communication such as OFDM or multicode CDMA have a disadvantage of power variation of the transmitted signal. The present invention provides reduced power variation without compromising performance or bandwidth. Information symbols to be transmitted on the individual subchannel are fed to encoders which map the information symbols into channel symbols by increasing their order. The encoding in response to a forward error correction scheme and includes selection between redundant symbol values to reduce power variation. Preferably the encoder includes a trellis coder jointly encoding the symbols and a compensation data set to reduce power variation.

13 Claims, 5 Drawing Sheets

U.S. PATENT DOCUMENTS

| | | | | |
|---|---|---|---|---|
| 5,894,498 A | * | 4/1999 | Kotzin et al. | 375/295 |
| 5,914,933 A | | 6/1999 | Cimini et al. | 370/208 |
| 5,982,818 A | * | 11/1999 | Krueger et al. | 375/265 |
| 6,125,103 A | * | 9/2000 | Bauml et al. | 370/203 |
| 6,128,351 A | * | 10/2000 | Jones et al. | 375/284 |
| 6,130,918 A | * | 10/2000 | Humphrey et al. | 375/295 |
| 6,175,551 B1 | * | 1/2001 | Awater et al. | 370/210 |
| 6,556,557 B1 | * | 4/2003 | Cimini et al. | 370/342 |

FOREIGN PATENT DOCUMENTS

| | | |
|---|---|---|
| EP | 0822690 A2 | 2/1998 |
| WO | WO96/13918 | 5/1996 |
| WO | WO97/26743 | 7/1997 |
| WO | WO98/11698 | 3/1998 |

OTHER PUBLICATIONS

Fernando, W.A.C., Rajatheva, R.M.A.P., "Performance of COFDM for Leo Satellite Channels in Global Mobile Communications", IEEE, 1998, XP002118737m pp. 1503-1507.

Morrison, I.S. ACE-QPSK: A New Method Of Coding QPSK For The Nonlinear Transmitter; Australian Space Centre for Signal Processing, University of South Australia; XP-002118738.

Ochiai, H. and Pmai, H.: "OFDM-CDMA with Peak Power Reduction Based on the Spreading Sequences"; Institute of Industrial Science, University of Toyko; IEEE 1998; pp. 1299-1303.

* cited by examiner

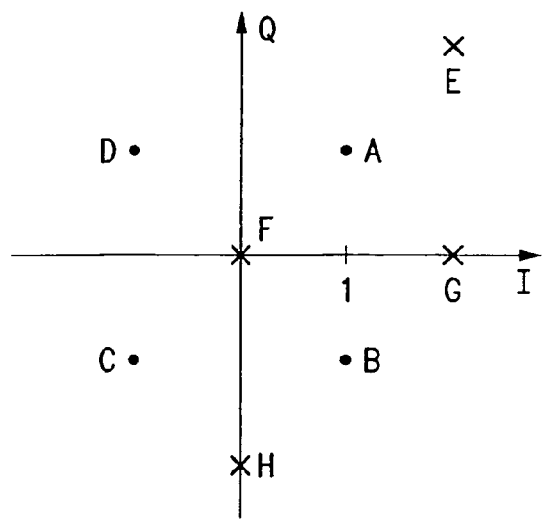
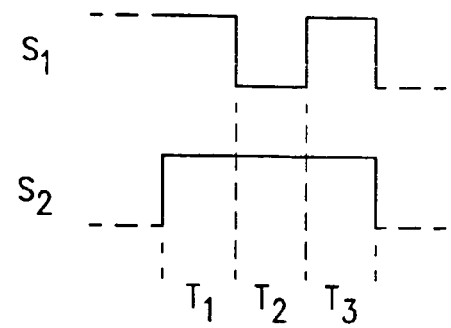
*FIG.7A*  *FIG.7B*
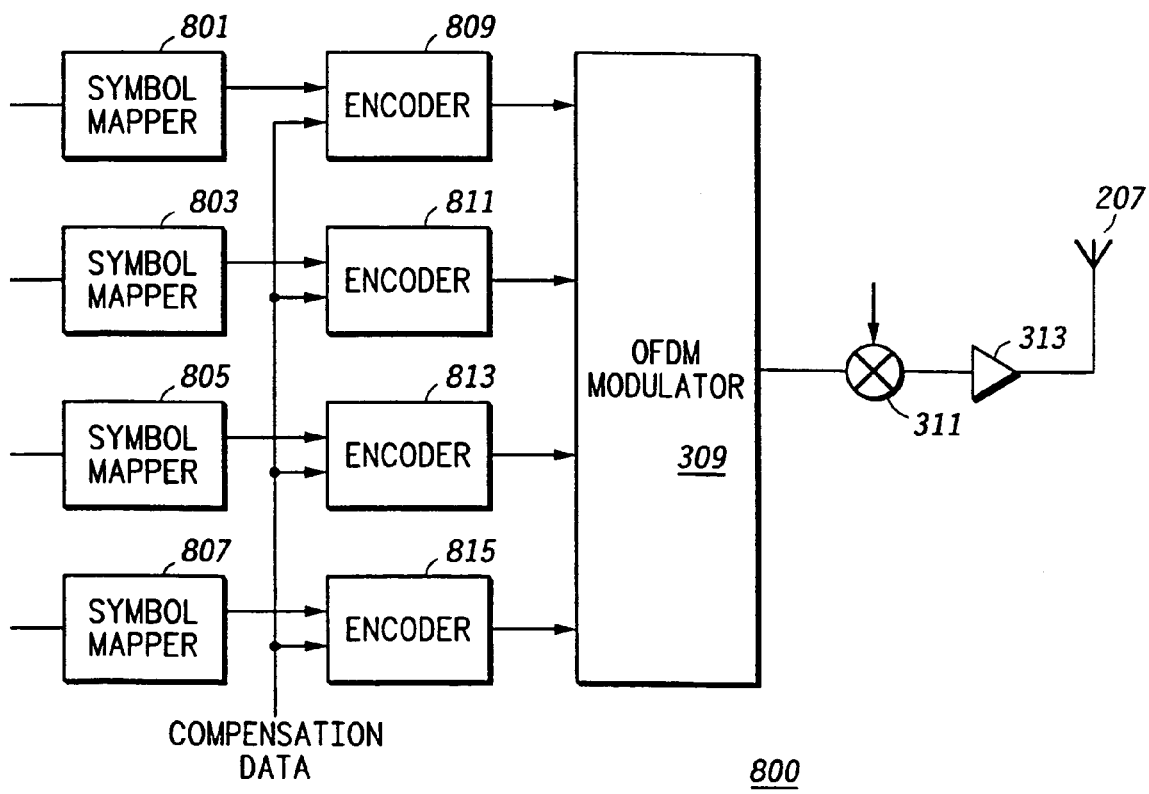
*FIG.8*

COMMUNICATION SYSTEM WITH REDUCED POWER VARIATION AND METHOD THEREFOR

FIELD OF THE INVENTION

The present invention relates to a communication system with reduced power variation wherein data from a transmitter is transmitted to a receiver over a plurality of subchannels and a method therefor. The invention is applicable but not limited to a cellular communication system.

BACKGROUND OF THE INVENTION

In a cellular communication system each of the mobile stations communicate with typically a fixed base station. Communication from the mobile station to the base station is known as uplink and communication from the base station to the mobile station is known as downlink. The total coverage area of the system is divided into a number of separate cells each covered by a single base station. The cells are typically geographically distinct with an overlapping coverage area with neighbouring cells. As a mobile station moves from the coverage area of one cell to the coverage area of another cell, the communication link will change from being between the mobile station and the base station of the first cell to being between the mobile station and the base station of the second cell. This is known as a handover. Specifically, some cells may lie completely within the coverage of other larger cells.

All base stations are interconnected by a fixed network. This fixed network comprises communication lines, switches, interfaces to other communication networks and various controllers required for operating the network. A call from a mobile station is routed through the fixed network to the destination specific for this call. If the call is between two mobile stations of the same communication system the call will be routed through the fixed network to the base station of the cell in which the other mobile station currently is. A connection is thus established between the two serving cells through the fixed network. Alternatively, if the call is between a mobile station and a telephone connected to the Public Switched Telephone Network (PSTN) the call is routed from the serving base station to the interface between the cellular mobile communication system and the PSTN. It is then routed from the interface to the telephone by the PSTN.

Many different modulation methods are known for communication in cellular and other communication schemes. Some of these involve the transmission of data from a transmitter to a receiver over a plurality of distinct subchannels. Examples of this include Orthogonal Frequency Division Multiplex (OFDM) or multicode Code Division Multiple Access (CDMA) schemes. A common characteristic of these modulation schemes is that the transmitted power varies substantially dependent on the data in the subchannels resulting in a high peak to average ratio of the transmitted power.

A method of reducing this ratio is described in WO98/11698, which describes and OFDM system where 'n' bit data words are encoded as $2^m$ symbol words, with the symbol words being generated to result in a desired low peak to average ratio. The document discloses introduction of error correction by increasing the size of the code word relative to the data word and transmitting the additional symbols over additional subchannels.

In order to limit degradation and spectral spreading of the transmission, a high peak to average ratio of the transmit power requires that the output power amplifier has to be linear over a wide dynamic range. This significantly impairs the cost and efficiency of the power amplifier. This is especially a problem in mobile communication systems where a low efficiency of the output amplifier significantly reduces the battery life of the mobile station.

Substantial benefits can thus be obtained by reducing the variations of the transmit power.

SUMMARY OF THE INVENTION

The invention seeks to provide a system for reducing the peak to average of transmissions in a communication system using a subchannel modulation scheme.

According to a first aspect of the invention, there is provided a communication system with reduced power variation wherein data is transmitted over a plurality of subchannels comprising at least one means of generating information symbols, a subchannel transmitter for transmission of channel symbols on individual subchannels in a combined signal, at least one encoder for encoding information symbols into higher order channel symbols at substantially the same symbol rate, the encoding both being in response to a forward error correction scheme and including selection between redundant symbol values to reduce power variation of the combined signal, and a subchannel receiver receiving the higher order channel symbols and regenerating the information symbols, characterized in that one channel symbol is generated for each information symbol.

Preferably, the average symbol energy of the channel symbols is substantially the same as the information symbols and the encoding of information symbols into higher order channel symbols is done independently for each subchannel.

According to a preferred feature of the invention the forward error correcting scheme is a trellis coding scheme.

According to a second preferred feature of the invention, the encoder comprises a first data input for the information symbols and at least a second data input for compensation data, the communication system further comprising means for generating compensation data reducing the amplitude variations of the combined signal.

Preferably, the communication scheme employed is an Orthogonal Frequency Division Multiplex (OFDM) subchannel communication scheme or a multicode Code Division Multiple Access (CDMA) subchannel communication scheme.

According to a second aspect of the invention, there is provided a method of reducing power variation in a communication system wherein data is transmitted over a plurality of subchannels, the method comprising generating information symbols, transmitting channel symbols on individual subchannels in a combined signal, encoding information symbols into higher order channel symbols at substantially the same symbol rate, the encoding both being in response to a forward error correction scheme and including selection between redundant symbol values to reduce power variation of the combined signal, and receiving the higher order channel symbols and regenerating the information symbols.

The invention thus enables a reduction in the power variation of a subchannel transmitter without degrading performance or increasing transmission bandwidth by increasing the order of the channel symbols, introducing forward error correction coding and selecting between redundant symbol values so that power variation is minimised.

BRIEF DESCRIPTION OF THE DRAWINGS

An embodiment of the present invention is described below, by way of example only, with reference to the accompanying drawing, in which:

FIG. 7 is an illustration of the possible constellation points for a QPSK symbol and of a short section of the spreading codes for the two subchannels.

FIG. 8 is a block diagram of a 4 channel OFDM subchannel transmitter in accordance to the invention.

DESCRIPTION OF A PREFERRED EMBODIMENT

Figure 1:
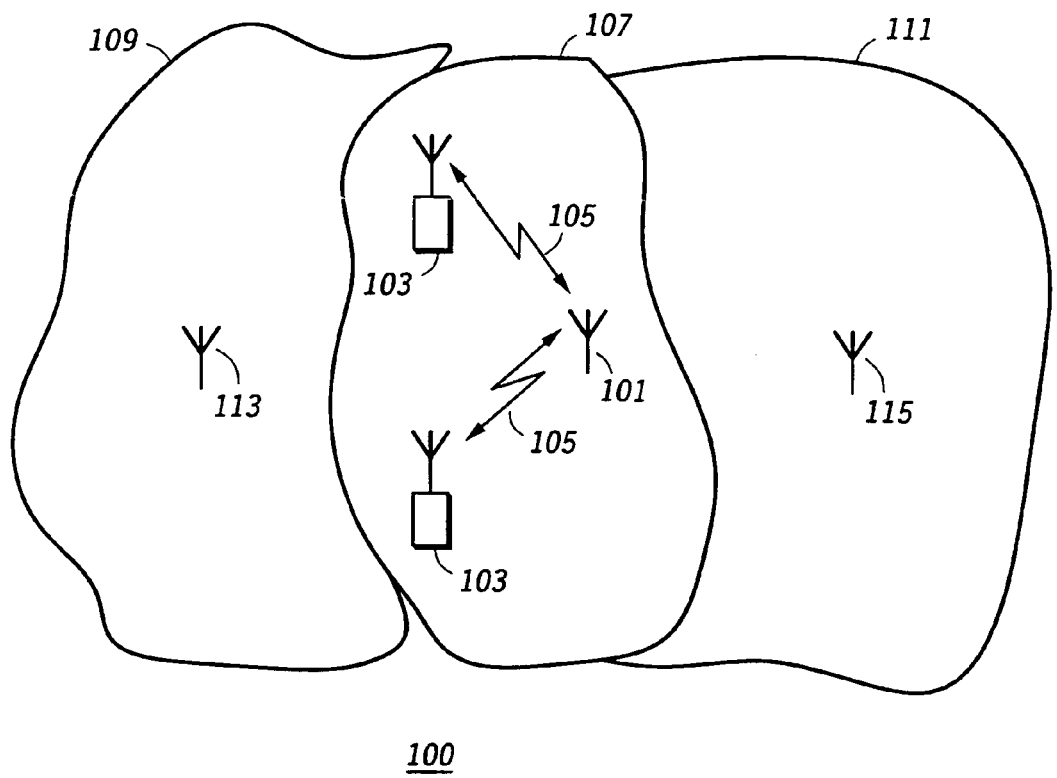
FIG. 1 is an illustration of a cellular communication system according to prior art.

FIG. 1 illustrates a cellular communication system 100. In the system, a base station 101 communicates with a number of mobile station 103 over radio channels 105. In the cellular system, the base station 101 covers users within a certain geographical area 107 whereas other geographical areas 109, 111 are covered by other base stations 113, 115. Typically, each of the base stations 101, 113, 115 contain a broadcast carrier plus one or more traffic carriers.

Figure 2:
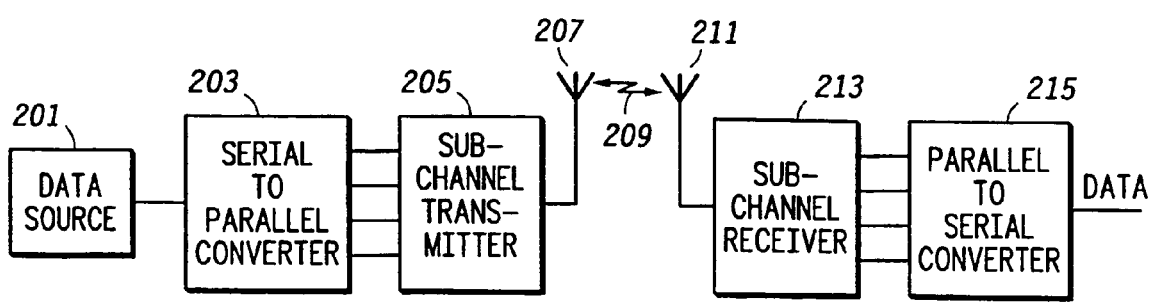
FIG. 2 is a block diagram of an example of a single communication link between one mobile station and one base station using a subchannel modulation scheme using conventional means.

FIG. 2 illustrates an example of a link between one mobile station 103 and one base station 101 using a subchannel modulation scheme. In the example, the data from a single data source 201 is separated into subchannels in a serial to parallel converter 203. Alternatively, the data on different subchannels may originate from different data sources. The serial to parallel converter 203 is connected to a subchannel transmitter 205 which modulates the data, amplifies and transmits the modulated signal over the radio channel 209 by use of an antenna 207. The signal is received by a receive antenna 211 connected to a subchannel receiver 213 which regenerates the data transmitted on each individual subchannel. In the example, the data received in the subchannels are combined into a single data stream by a parallel to serial converter 215.

Figure 3:
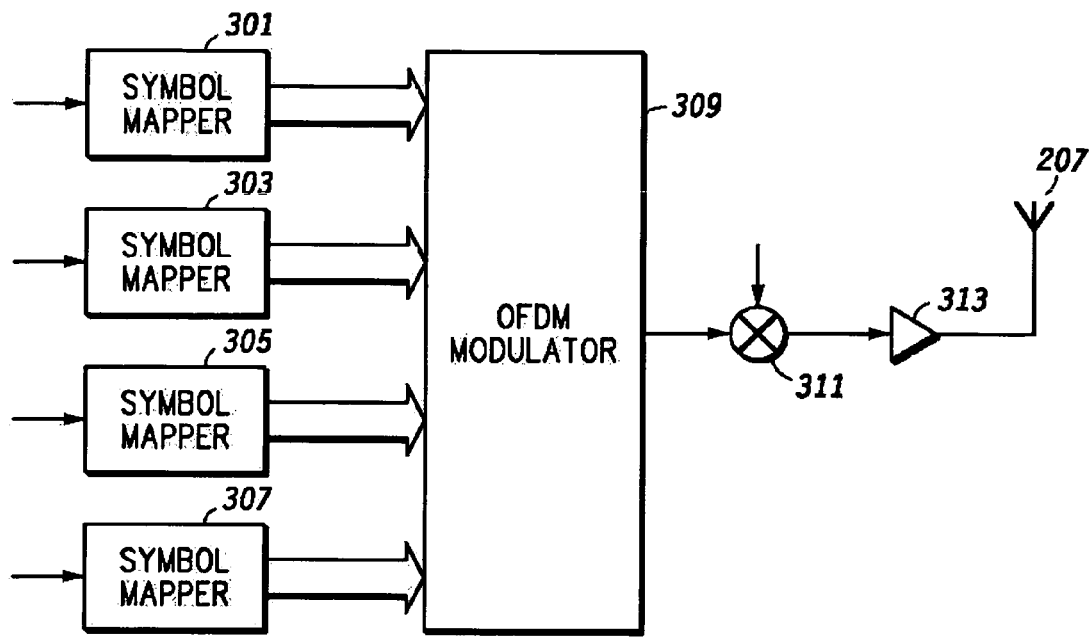
FIG. 3 is a block diagram of a conventional 4 subchannel transmitter using an OFDM modulation scheme.

FIG. 3 illustrates the principle of a 4 subchannel transmitter 300 using an OFDM modulation scheme. The data in each subchannel is fed to a symbol mapper 301–307 which maps the data into a complex symbol for transmission on the subchannel. The complex symbols are fed to the OFDM modulator 309 which generates an OFDM modulated signal s(t) given by $$s(t) = \sum_{i=-\infty}^{\infty} \sum_{k=0}^{3} \text{Re}[d_{i,k} \cdot e^{j2\pi f_k t}] rect\left(\frac{t - iT - T/2}{T}\right)$$

where $d_{i,k}$ is data symbol i on subchannel k, $f_k$ the modulation frequency of subchannel k given by $f_k = k \cdot f_0$ where $f_0$ is the frequency of the subchannel with the lowest frequency. Re(x) denotes the real part of x and rect(x) is given by $$Rect(x) = \begin{cases} 1 & 0 \leq x < 1 \\ 0 & \text{Otherwise} \end{cases}$$

The individual subchannels carrying the subchannel information is thus combined into a combined signal by the OFDM modulator. The combined signal is frequency shifted to the carrier frequency in a multiplier (or mixer) 311 and fed to the antenna 207 through an amplifier 313.

Figure 4:
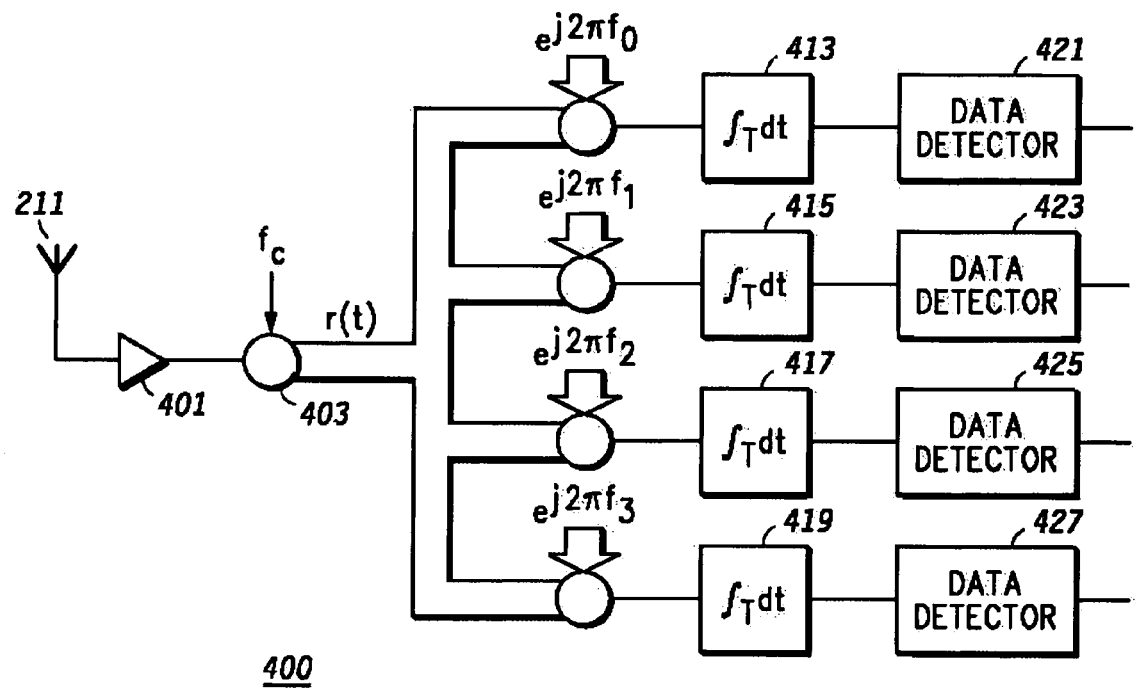
FIG. 4 is a block diagram of a conventional OFDM subchannel receiver 400 for four subchannels.

FIG. 4 illustrates the principle of an OFDM subchannel receiver 400 for four subchannels. The signal from the receive antenna 211 is fed to a low noise amplifier 401 and the amplified signal is fed to a multiplier (or mixer) 403 down converting the signal to complex base band. The down-converted signal is fed to four complex multipliers and the output signal of each multiplier is fed to an integrator 413–419. The output signal on subchannel k is thus given by $$r_k(t) = \int_{iT}^{(i+1)T} r(t) \cdot e^{-2\pi f_k \cdot t} dt$$

where r(t) is the down-converted received base band signal. In each subchannel the integration over a symbol period will result in the signals from other subchannels cancelling out whereas the signal in the current subchannel is restored to an integration of the basic pulse shape, in this case given by the rect(x) function. The output of the integrators are fed to data detectors 421–427 which estimates the received symbol and maps it into the received data in the subchannel.

A more detailed description of OFDM modulation can be found in 'COFDM modulation: an overview' by W. Y. Zou and Y. Wu in IEEE Transactions on Broadcasting Vol. 41 No. 1 pp 1–8, March 1995.

Figure 5:
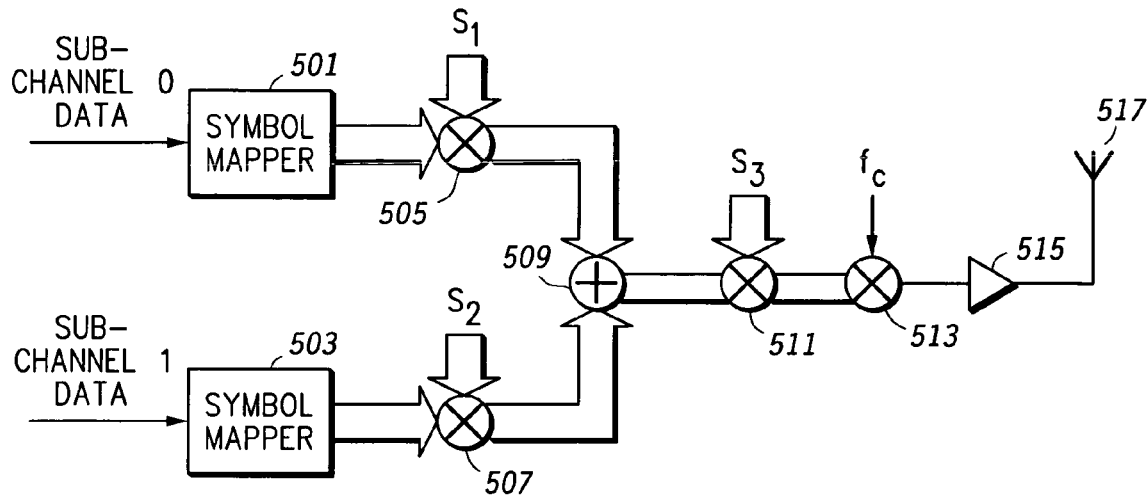
FIG. 5 is a block diagram of conventional 2 channel subchannel transmitter using a multicode CDMA subchannel modulation scheme.

FIG. 5 illustrates an example of a 2 channel subchannel transmitter 500 using a multicode CDMA subchannel modulation scheme. The input data in the two subchannels are mapped into complex symbols by the symbol mappers 501, 503. The complex symbols are multiplied by a first spreading code in multipliers 505, 507. The first spreading code is different for each subchannel and preferably the spreading codes are orthogonal between the channels. The two channels are added together in an adder 509 and the sum is in this example spread by multiplication in a second multiplier 511 by a common spreading code. The output of the multiplier is fed to a quadrature modulator 513 and the resultant signal is amplified in an amplifier 515 before being transmitted by the antenna 517.

Figure 6:
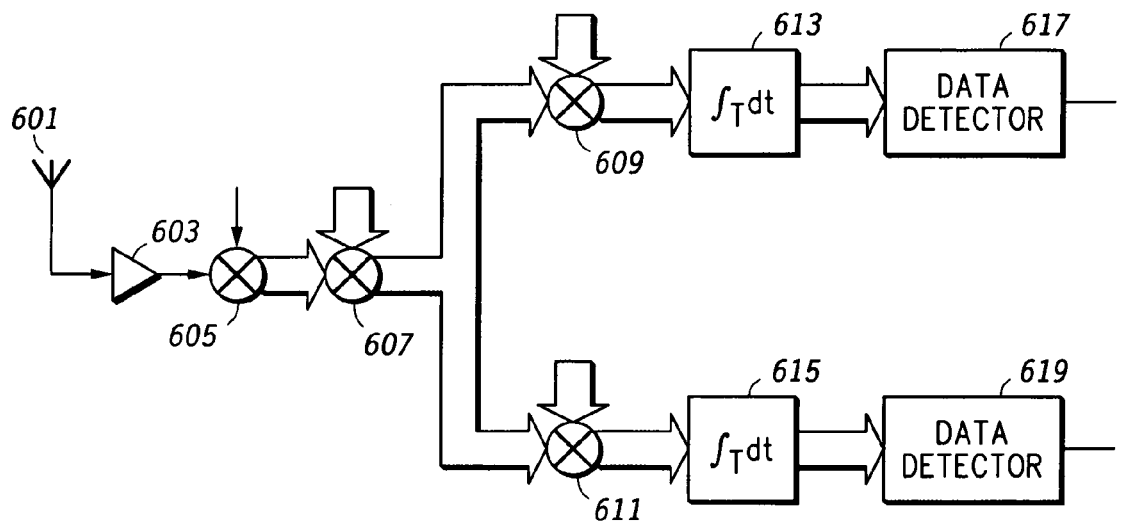
FIG. 6 is a block diagram of a conventional multicode CDMA 2 channel subchannel receiver.

FIG. 6 illustrates the principle of a multicode CDMA 2 channel subchannel receiver 600. The radio signal is received by an antenna 601 and amplified in a low noise amplifier 603. The output of the amplifier 603 is fed to a quadrature down converter which generates complex base band signal. This signal is de-spread by the common spreading code in a multiplier 607 before being fed to multipliers 609, 611 where the signal is de-spread with the spreading code in each subchannel. The output of the multipliers 609, 611 is fed to symbol time integrators 613,614. The signal for the other subchannel will for orthogonal spreading codes integrate to zero whereas the wanted signal following de-spreading will be restored to the non spread signal transmitted in this subchannel. the output of the integrators is fed to data detectors 617,619 which estimates the received symbol and generates the received data in the subchannel.

Further description of CDMA communication systems can be found in 'Spread Spectrum CDMA Systems for Wireless Communications' by Savo Glisic and Branca Vucetic, Artech House, 1997, ISBN 0-89006-858-5 and in 'Multi-Carrier Spread Spectrum Modulation with Reduced Dynamic Range' by V. Aue and G. P. Fettweis, proceedings of IEEE 46th Vehicular Technology Conference, 1996, p 914.

In both OFDM and CDMA subchannel transmitters, the complex symbols transmitted will add up to a signal with varying amplitude as a consequence of the relative phase difference between the symbols. An example is given in FIG. 7 for a two channel CDMA transmitter using Quaternary Phase Shift Keying (QPSK).

FIG. 7(*a*) illustrates the possible constellation points A, B, C, D for a QPSK symbol and FIG. 7(*b*) illustrates an example of a short section of the spreading codes $S_1$ and $S_2$ for the two subchannels. Assuming the symbol constellation A is transmitted in both subchannels, the signals will add constructively during time interval $T_1$ and $T_3$ resulting in a summed signal corresponding to point E on FIG. 7(*a*). During time interval $T_2$ the two signals will have opposite phases due to the opposite signs of the spreading codes in this interval and the two signals will cancel out resulting in the constellation point F on FIG. 7(*a*). The amplitude variation of the transmitted signal is thus from $2\sqrt{2}$ during time interval $T_1$ and $T_3$ to zero during $T_2$.

If however symbol A is transmitted in the first subchannel and symbol B is transmitted in the second subchannel, the two channels will add together in point G during $T_1$ and $T_3$, and in point H during interval $T_2$. The amplitude of both point G and H is 2 and there is thus no amplitude variation in this case.

A high amplitude or power variation is disadvantageous in a transmitter as it requires a large dynamic range of linearity of the power amplifier. This significantly increases the complexity and cost of the amplifier and reduces the efficiency. Any non-linearity will furthermore distort the transmitted signal and increase the out of band transmission. The problems are enhanced in mobile stations where long battery life and low complexity amplifiers are required.

According to an embodiment of the present invention, the peak to average ratio of the transmit power level is reduced by mapping the information symbols into higher order channel symbols and selecting between redundant symbol values so that the power variation is reduced. In addition, the order of the symbols are increased to allow forward error correcting coding to compensate for reduction in the minimum distance between the symbols.

The term 'information symbols' denotes the data symbols directly corresponding to the source data in the appropriate subchannel before any processing such as forward error correcting coding. 'Channel symbols' denote the symbols actually transmitted over the radio link and thus include any forward error correcting coding etc. A channel symbol being of higher order than an information symbol means that there are more constellation points of the symbol, such as for example a QPSK symbol being of higher order than a BPSK symbol.

The embodiment is described in more detail in the following for the specific example where the data to be transmitted on each subchannel is mapped into Binary Phase Shift Keying (BPSK) symbols. FIG. 8 illustrates the embodiment for a 4 channel OFDM subchannel transmitter 800 corresponding to the one illustrated in FIG. 3. The symbol mappers 301–307 are in this case specifically BPSK symbol mappers 801–807. The output of the symbol mappers 801–807 are fed to encoders 809–815 which encode the information symbols into channel symbols by increasing the order of the symbols and using the increased redundancy to reduce power variation and include forward error correcting coding.

Figure 9A:
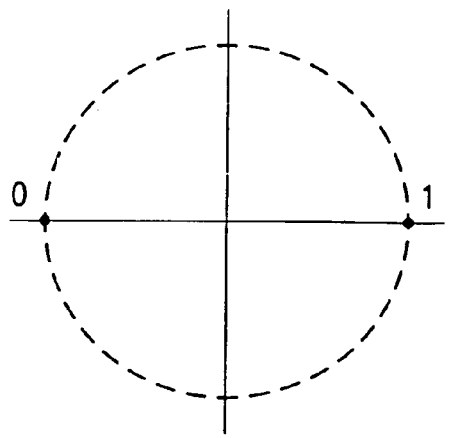
FIG. 9 is an illustration of the constellation points for a BPSK symbol and an 8-PSK symbol.
Figure 9B:
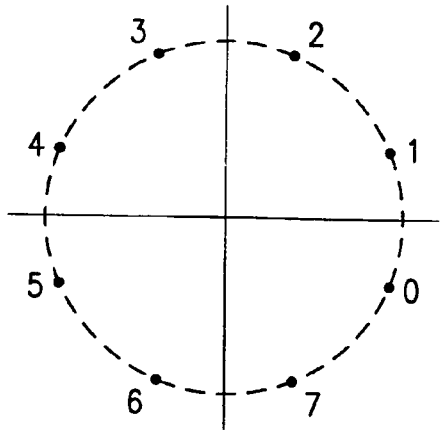
Figure 10:
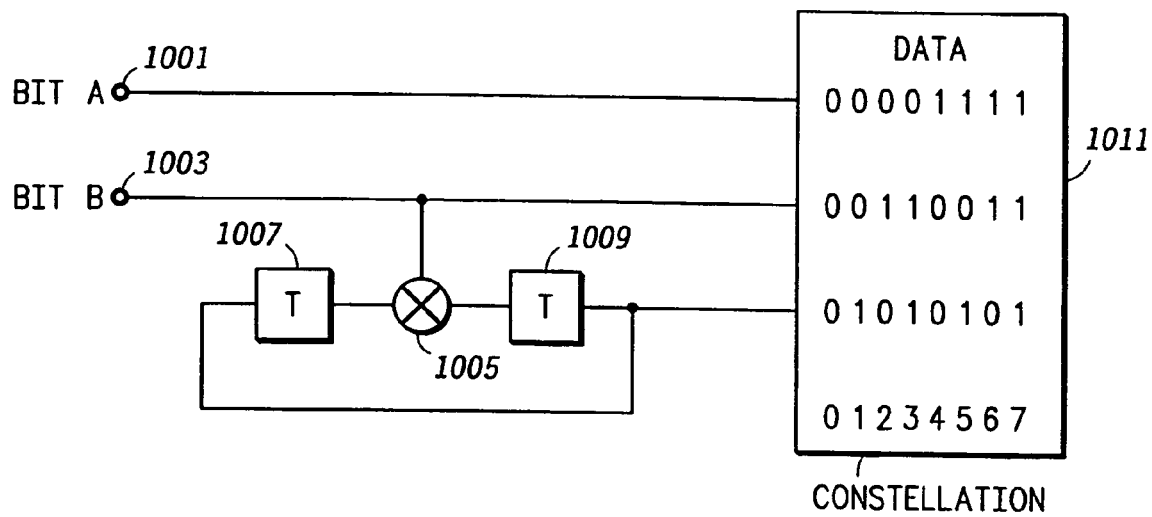
FIG. 10 is an illustration of an example of a trellis coder.

Preferably, the encoder will map the BPSK signal into 8 point Phase Shift Keying (8 PSK) using 2 bit trellis coding. FIG. 9 illustrates the constellation points for a BPSK symbol (FIG. 9(*a*)) and an 8-PSK symbol (FIG. 9(*b*)). FIG. 10 illustrates an example of a trellis coder 1000 which comprises two data inputs 1001,1003, the second input being fed to a binary multiplier 1005 which together with two delay elements 1007, 1009 generates a third binary value and introduces convolutional encoding. The three binary data values are fed to a data mapper 1011 which maps the data vector into the corresponding constellation point. A more detailed description of trellis coding can be found in 'Trellis-coded Modulation with Redundant Signal Sets Part 1: Introduction' by G. Ungerboeck in IEEE Communications Magazine, February 87 Vol 25 No 2 or in 'Trellis Coding' by Christian Schlegel, IEEE Press 1997, ISBN 0-7803-1052-7.

The BPSK data from the symbol mappers 801–807 are fed to the second data input 1003 of the encoders 809–815. As can be seen from the mapping the data on the first data input 1001 shifts the channel symbol of the subchannel by 180°. By setting the first data input 1001 of each encoder the channel symbols on each subchannel can thus be rotated with respect to each other to reduce the power variation. The first data input 1001 is for each symbol and each encoder thus set to the value which for the current set of symbols across the sub-channels results in the lowest power variation with respect to the average power of the transmission.

The determination of the appropriate compensation data to be applied to the first input 1001 of each encoder is preferably achieved by evaluating the power variation for all possible settings and choosing the one with the lowest variation.

According to one embodiment all possible settings of the data compensation vector are evaluated for all possible combinations of the information symbols on the subchannels. This evaluation can be carried out prior to operation and the preferred compensation data can be stored in a memory unit. The memory input will for every symbol be fed the information symbols of all subchannels and will generate the corresponding compensation data which is fed to the first data input 1001 of all encoders.

Due to inter symbol interference the power level variation may not only depend on the channel symbols currently being transmitted but also on previously transmitted symbols. According to an alternative embodiment, the compensation data for the current symbol is determined in response not only to the current symbol but also to other symbols transmitted before or after the current symbol. Specifically, if transmission is of a bursty nature, the data transmitted in the entire burst is preferably considered when determining the compensation data for the information symbols of the burst. Preferably, this is achieved by evaluating the power level variation over the burst for all possible data combinations in the burst and for all possible compensation data combinations prior to operation and the optimum choice of compensation data is stored in a memory unit. During operation the set of data to be transmitted during the burst is fed to the memory unit, and the corresponding set of compensation data is obtained on the output of the memory unit.

When receiving the transmitted signal, the receiver demodulates and decodes the trellis code as is known in the art. However, as the first data input 1001 does not carry any information but is solely used for reducing the power variation of the transmission, the corresponding bit can be ignored in the receiver.

As one channel symbol is generated for each information symbol, the symbol rate and thus bandwidth of the transmission does not increase by the trellis coding and power variation reduction. Furthermore, the energy per symbol of the information and channel symbols is preferably maintained identical. As the minimum distance between constellation points is reduced, the uncoded symbol error is increased but this is compensated for by the trellis coding. The invention thus provides reduction of the peak to average power ratio without increasing the transmit power or bandwidth of the transmission.

According to an alternative embodiment the forward error correcting coding is not done independently on each subchannel but is done by applying error correction to the set of data across the subchannels. In this embodiment the channel symbol in one subchannel will depend on the information symbols in other subchannels and not just on the information symbols in the current subchannel.

In a different embodiment of the invention applicable to a subchannel CDMA transmitter with QPSK information symbols, the information symbols are encoded into 16 QAM (Quadrature Amplitude Modulation) using Trellis Coding. This results in similar performance as QPSK for the same transmission bandwidth and power, and provides a redundant bit for rotating each channel symbol permitting reduction in power level variations. This embodiment is suitable for the Universal Mobile Telecommunication System (UMTS) under standardisation by the European Telecommunication Standards Institute (ETSI).

It will be apparent to the person skilled in the art that other error correcting schemes such as block coding or convolutional coding can be used instead of Trellis Coding.

In addition to the forward error correcting coding introduced in the encoders, conventional forward error correcting coding can be applied to the data as is well known in the art. As a specific example referring to FIG. 2, a Viterbi coder can be inserted between data source 201 and the serial to parallel converter 203 or can be connected to each subchannel output of the serial to parallel converter 203. At the receive side, a Viterbi decoder will be inserted at the output of the parallel to serial converter 215 or at each subchannel input to the parallel to serial converter 215 respectively.

According to a different embodiment the compensation data is not simply ignored at the receiver but is demodulated and an estimate of the received redundant compensation data is derived. This estimate is used for evaluating a transmission quality preferably by evaluating the error probability of the received compensation data. For example, a memory unit containing the pre-calculated compensation data for the current information symbols as used in the transmitter can be included in the receiver. After demodulation and decoding the received information symbols can be used as input for the memory unit in the receiver which will output the corresponding compensation data. This can be compared to the received compensation data and the difference between the two will indicate the error probability and thus the transmission quality.

Each subchannel will typically have a specified transmission format associated with it and this may be predefined or adaptively modified according to the requirements and conditions of the communication system. According to one embodiment of the invention the transmission format is different on different subchannels. For example, one subchannel may use 8PSK channel symbols for transmission of BPSK information symbols whereas another subchannel may simultaneously employ 16 QAM channel symbols for transmission of QPSK information symbols. Another example is where transmissions only occur on some subchannels whereas other subchannels have no transmissions. Preferably, the encoding is performed independently on each subchannel in this embodiment.

Alternatively or in addition the power level of the transmissions in each subchannel may be different and the corresponding encoding can vary accordingly. For example if four subchannels are transmitted at say twice the power level of four other subchannels, the encoding for reduced power variation according to the current invention may be applied to these four subchannels only.

The encoding and application of the described technique can be dynamically altered to suit the current needs and conditions. Specifically, in a cellular communication system the transmitted power of a mobile station will vary with the distance between the base station and the mobile station. When the mobile station is far from the base station the transmitted power will be close to the maximum and in order to ensure a high efficiency without distortion of the transmitted signal the power variations must be reduced to a minimum. However, when the mobile station is close to the base station a substantially lower power level is transmitted and the efficiency will not be significantly affected by power variations. At the low power level the power amplifier will furthermore not be close to clipping or non-linear amplification and the distortion is thus reduced significantly.

Accordingly, the technique for reducing power variations may only be applied to mobile stations close to the edges of the cells but not to mobile stations close to the base station and hence transmitting at low power. A more flexible approach is to alter the information and channel symbol transmission rates and thus the encoding algorithm according to the current conditions.

The symbol mappers, encoders and the memory unit are preferably implemented in a suitable processor, such as a microprocessor or digital signal processor with associated memory, or is alternatively implemented in an integrated circuit.

It will be apparent to the person skilled in the art that the function performed by the symbol mappers, encoders and memory unit can be integrated in a single unit which generates the channel symbols in response to the data. The single unit may furthermore include the serial to parallel converter.

The invention is applicable to cellular systems where the invention can be applied to only uplink transmissions, only downlink transmissions or to both uplink and downlink transmissions. It can furthermore be applied throughout the system or can be selectively employed for specific mobile stations or base stations.

It will be apparent to the person skilled in the art that the invention is not limited to a cellular communication system or to radio communication but is applicable to other subchannel transmission schemes.

The invention claimed is:

1. A communication system with reduced power variation wherein data is transmitted over a plurality of subchannels including
    at least one means of generating information symbols;
    at least one encoder for encoding information symbols into higher order channel symbols at substantially the same symbol rate, the encoding of an individual information symbol as a channel symbol including a forward error correction scheme for the channel symbol and including selection of the channel symbol from a higher order channel symbol constellation comprising redundant channel symbol values by evaluating the power variation for all possible redundant channel symbol values for a combined signal of the plurality of subchannels and choosing the channel symbol value producing the lowest power variation for the combined signal, and
    a subchannel transmitter for transmission of channel symbols on individual subchannels in the combined signal, characterized in that one channel symbol is generated for each information symbol; and
    wherein the at least one encoder is arranged to perform the apply the forward error correction scheme independently on the individual subchannels.

2. A communication system with reduced power variation as claimed in claim 1 wherein the encoding of information symbols into higher order channel symbols is done independently for each subchannel.

3. A communication system with reduced power variation as claimed in claim 1 wherein the forward error correcting scheme operates on a plurality of the subchannels.

4. A communication system with reduced power variation as claimed in claim 1 wherein the forward error correcting scheme is a trellis coding scheme.

5. A communication system with reduced power variation as claimed in claim 1 wherein BPSK information symbols are encoded into 8PSK channel symbols.

6. A communication system with reduced power variation as claimed in claim 1 wherein the encoder comprises a first data input for the information symbols and at least a second data input for compensation data, the communication system further comprising means for generating compensation data reducing the amplitude variations of the combined signal.

7. A communication system with reduced power variation as claimed in claim 6 wherein the means for generating compensation data comprises a memory unit with pre-calculated compensation data.

8. A communication system with reduced power variation as claimed in claim 6 wherein the compensation data for the current information symbols is determined is in response to the intersymbol interference to or from surrounding symbols.

9. A communication system with reduced power variation as claimed in claim 6 wherein a receiver generates estimates of the compensation data and evaluates a transmission quality in response to the estimates of the compensation data.

10. A communication system with reduced power variation as claimed in claim 1 wherein each subchannel has an associated transmission format and at least one characteristic of the transmission format of the subchannels is different between at least two subchannels.

11. A communication system with reduced power variation as claimed in claim 1 wherein an Orthogonal Frequency Division Multiplex (OFDM) subchannel communication scheme is employed.

12. A communication system with reduced power variation as claimed in claim 1 wherein a multicode Code Division Multiple Access (CDMA) subchannel communication scheme is employed.

13. A method of reducing power variation in a communication system wherein data is transmitted over a plurality of subchannels, the method comprising the steps of:
    generating information symbols;
    encoding said information symbols into higher order channel symbols at substantially the same symbol rate, the encoding of an individual information symbol as a channel symbol including a forward error correction scheme for the channel symbol and including selection of the channel symbol from a higher order channel symbol constellation comprising redundant channel symbol values by evaluating the power variation for all possible redundant channel symbol values for a combined signal of the plurality of subchannels and choosing the channel symbol value producing the lowest power variation for the combined signal;
    transmitting the channel symbols on individual subchannels in the combined signal; and
    receiving the higher order channel symbols and regenerating the information symbols, characterized in that one channel symbol is generated for each information symbol, and
    wherein the forward error correction scheme is applied independently on the individual subchannels.

* * * * *